PULSE MODULATION TRANSMITTER CIRCUITS

Filed Jan. 14, 1959 2 Sheets-Sheet 1

INVENTOR.
LEIGH A. BRITE,
BY
Noel B. Hammond
AGENT

PULSE MODULATION TRANSMITTER CIRCUITS

Filed Jan. 14, 1959 2 Sheets-Sheet 2

INVENTOR.
LEIGH A. BRITE,
BY Neil B. Hammond
AGENT

United States Patent Office 3,004,155
Patented Oct. 10, 1961

3,004,155

PULSE MODULATION TRANSMITTER CIRCUITS

Leigh A. Brite, Los Angeles, Calif., assignor to Hughes Aircraft Company, Culver City, Calif., a corporation of Delaware Filed Jan. 14, 1959, Ser. No. 786,892
15 Claims. (Cl. 250—17)

The present invention relates to radio transmitter circuits and more particularly, to circuits for reducing the effects of fading of signals propagated over non-line-of-sight paths.

In communications systems making use of ionospheric propagation several reflection paths may exist for the propagated signals. Consequently, several components of a transmitted wave are usually received at the receiver. Since all path lengths are not exactly the same, the received wave components will differ in relative radio frequency phase and in arrival time. The relative phase difference between wave components can fluctuate very rapidly due to slight changes in path lengths. These slight fluctuations cause signal fading as the multipath components alternately add or cancel. Differences in arrival time of multipath components of a pulse signal result in the lengthening or stretching of the composite received pulse signal which limits the speed of transmission of pulse signals.

It is an object of the present invention to provide transmitter circuits for reducing the effects of cancellation between out-of-phase carrier wave components received simultaneously.

It is another object of the invention to reduce the effects of signal fading due to multipath propagation by modifications made at the transmitter rather than at the receiver.

These and other objects of the invention may be achieved by employing a pulse-modulation transmitter having a circuit which modifies a pulse-modulated carrier wave to reduce the deleterious effects of cancellation between out-of-phase carrier wave components received simultaneously. This result is accomplished by varying the phase of the carrier wave a plurality of times during each modulation pulse at quasi-random intervals. In the exemplary embodiment described, groups of control pulses occurring at quasi-random intervals are developed by applying initiating pulses to the input terminals of a tapped delay line and combining the resultant output pulses at the taps in a quasi-random fashion. The initiating pulses are synchronized with the modulation pulses so that each group of control pulses starts at the beginning of a modulation pulse. The delay times between the taps of the delay line, the number of taps, and the duration of the initiating pulses are selected or adjusted to cause each group of control pulses to end at the end of the corresponding modulation pulse. The control pulses are applied to a phase-varying circuit which is in series between a carrier-wave generator and transmitter output circuit. When a control pulse occurs the phase of the carrier wave is changed by the phase-varying circuit. Thus, the phase of the carrier wave is varied at quasi-random intervals during each modulation pulse.

For a better understanding of the invention, together with other and further objects thereof, reference may be made to the following description taken in connection with the accompanying drawings in which an embodiment of the invention is illustrated by way of example only, like reference characters designating like parts throughout the figures thereof and wherein.

Figure 1:
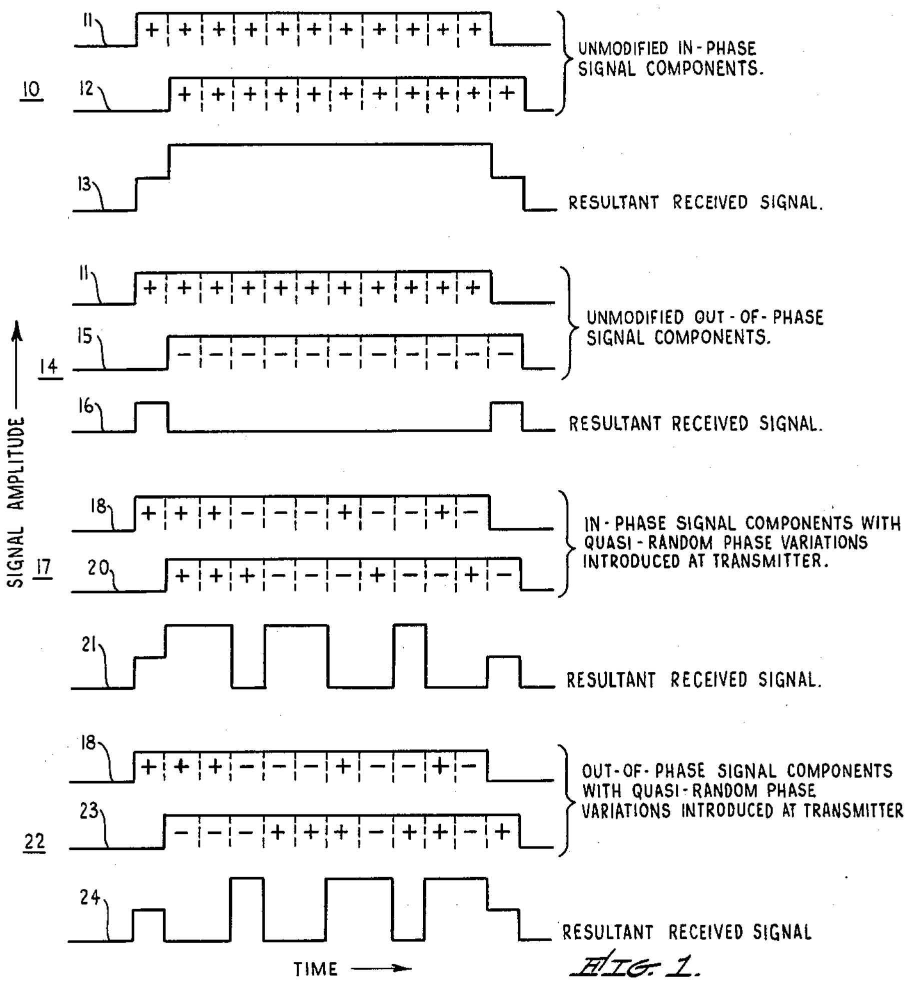
FIG. 1 is a graphical representation of the effects of cancellation of multipath signal components, both with and without use of the circuits of the present invention.

Referring now to FIG. 1 of the drawings, which is a graph in which time is along the abscissa and signal amplitude along the ordinate, reference numeral 10 indicates generally, a group of three curves which illustrate the received signal resulting from combining two in-phase signal components. The problems involved in multipath propagation of pulse information may be visualized by considering these curves. Curve 11 represents the energy in a first received pulse component. For convenience, it has been arbitrarily divided into eleven units, to which a phase is assigned, plus (+) indicating any arbitrary phase and, in the subsequent curves, a minus (−) will indicate carrier wave phase which is 180° shifted in phase from the arbitrary phase. In the group of waveforms 10, all the units of the signal 11 are assumed to be of like phase. A second curve 12 indicates that a second pulse is received one unit later having the same phase as the pulse in curve 11. Curve 13 indicates that the resultant pulse energy which is applied to the receiver is 22 units. This result therefore provides a maximum signal from the two paths.

Now the case of two components received out of phase will be considered. Reference numeral 14 indicates generally a group of curves representing this condition. As before, curve 11 represents a first received pulse, the units of which have an arbitrary phase indicated by a plus (+). One unit later, the second received pulse component described by curve 15 is received, all the units of this component having the opposite phase. Due to cancellation, only two units of pulse energy are actually applied to the receiver, as indicated by curve 16. A minimum of energy is thus provided in this example. Thus, it can be seen that the composite received signal may fluctuate between 2 and 22 units of energy in the example shown.

Now consider the case of a carrier wave modulated by a pulse in which the carrier wave has a number of phase reversals at arbitrary or random intervals throughout the pulse. In the curve group designated generally at 17, curve 18 illustrates a signal pulse having such random carrier wave phase reversals throughout. Curve 20 indicates a second signal component received one unit later and having no relative phase shift. As will be seen in curve 21 the resultant received signal energy has a value of 12 units.

In curve group 22, the transmitted patern is like that of group 17 but the second received signal component illustrated by a curve 23 has a 180° phase reversal. It will be noted that again the resultant received signal indicated by curve 24 has a value of 12 units. Thus, it can be seen that by introducing a series of phase variations into the transmitted signal pulse, the fading of signal strength due to multipath cancellation is greatly reduced.

It can also be shown that similar results are obtained with various values of time delay between the two arriving components. The example shown is an extreme case and is chosen since it produces severe fades in the normal non-phase-changed situation. It can also be shown that similar results are obtained when signal components from more than two paths are present. In all cases, the phase-changed signal minimizes the variations in average received level of a pulse which would otherwise fade between wide limits of average level due to fluctuations in the relative carrier wave phase of arriving components.

Figure 2:
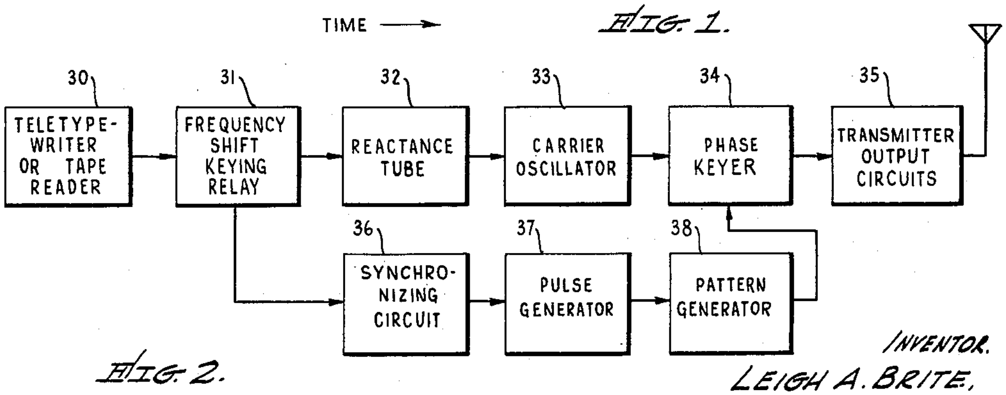
FIG. 2 is a block diagram of an embodiment of a pulse transmitter in accordance with the present invention which employs a synchronizing circuit, a pattern generator and a phase keyer.

Referring now to FIG. 2, there is illustrated in block form a frequency shift radio teletype transmitter which produces, in accordance with the present invention, a series of quasi-random phase shifts throughout the duration of each transmitted pulse. A data source such as a teletypewriter or tape reader 30 provides keying information to keying means such as a keying relay 31. The keying relay 31 may be of the electromechanical type or the electronic type, in accordance with present practice. A frequency shifting circuit such as a reactance tube 32 is connected to the keying relay 31 and in response to keying pulses from the keying relay 31 shifts the frequency of a carrier wave produced by an oscillator 33 between "mark" and "space" frequencies. A phase keyer 34 modifies the "mark" and "space" pulses developed by the carrier oscillator 33 and they are then amplified in the transmitter output circuits 35 and radiated.

Although the carrier wave could be generated complete with phase reversals and then keyed or modulated by the desired data, it is generally better for the phase reversal pattern to be synchronous with the data pulses to be transmitted. Accordingly, a synchronizing circuit 36 develops synchronizing pulses in response to the keying pulses from the keying relay 31. To generate a quasi-random phase-shift keying pattern, pulses are developed by a pulse generator 37, synchronized by the synchronizing pulses from the synchronizing circuit 36, and applied to a pattern generator 38. The pattern generator 38, as will be explained more fully hereinafter, develops a series of quasi-randomly occurring control pulses synchronized with the frequency-shift modulation pulses which are applied to the phase keyer 34 to control the shifting of the phase of the carrier wave. As used herein, the term "quasi-random" denotes a series which is repeated in the same manner but which varies irregularly within the series. In a nonsynchronized system, a truly random pattern could be used. One of the Barker redundant codes, described on pages 282 and 283 of "Communication Theory" by Willis Jackson, published by Academic Press, Inc., New York, New York, is ideal for use with a synchronized phase-changing system.

The operation will be more fully described with reference to the circuits shown in FIGS. 4 and 5 taken in conjunction with the waveforms of FIG. 3. The keying relay 31 develops keying pulses indicated by curve 40 of FIG. 3. The synchronizing circuit 36 includes a differentiating circuit indicated generally at 42 which differentiates the keying pulses of waveform 40 to produce the trigger pulses of waveform 41. The keying pulses of waveform 40 in the present exemplification are standard 22 millisecond pulses used in 60-word-per-minute frequency-shift radio-teletype. The time-constant of the differentiating circuit 42 is adjusted to be short compared to the keying pulses. In the case of 22 millisecond keying pulses, a one-millisecond time-constant will be found satisfactory for differentiator 42. In order to invert the trigger pulses of waveform 41 they are applied to a phase inverter or phase splitter circuit indicated generally at 43, followed by a full wave rectifier circuit 44. At the output terminals of the synchronizing circuit 36 there will appear the synchronizing pulses indicated in waveform 45.

A pulse generator 37 develops recurrent pulses indicated in waveform 46 which are synchronized by the synchronizing pulses of waveform 45 to begin at the beginning of each keying pulse or baud interval of waveform 40. There may be several 22 millisecond intervals between successive keying pulses depending on the letter or character being transmitted, but each of the initiating pulses developed by the pulse generator 37 will commence at the beginning of each 22 millisecond interval. The length of the initiating pulses of waveform 46 is shorter than the 22-millisecond keying pulse, as it is the unit length described in connection with FIG. 1. In the embodiment to be described, the length of the initiating pulse or unit length is 2 milliseconds.

In order to form a random phase keying pattern, a pattern generator 38 is provided for developing quasi-randomly spaced control pulses in response to each initiating pulse. This is accomplished by delaying each initiating pulse by varied amounts to develop a series of delayed control pulses. This may be done by utilizing a tapped delay line, one baud or 22 milliseconds long, having taps every 2 milliseconds. Various taps may be connected together to provide the desired control pulse pattern. In the present embodiment, a number of sections of delay line are provided to develop the pattern illustrated in waveform groups 17 and 22 of FIG. 1. This pattern may be designated as +++−−−−+−−−+−, the pluses (+) indicating one phase state and the minuses (−) indicating the opposite phase state. Therefore, the pattern generator 38 will develop a control pulse for each plus of the desired phase pattern.

To develop a series of control pulses having the pattern described above, four delay line sections 52, 55, 58 and 62 are connected in cascade and are selected or adjusted to have time delay intervals of 2, 2, 8 and 6 milliseconds, respectively. Taps 48, 54, 57, 61 and 64 are provided at the input end of the first delay line section 52 and at the output ends of each of the delay line sections 52, 55, 58 and 62. Each of the tapes 48, 54, 57, 61 and 64 are connected together by means of summing resistors to form an output bus for the pattern generator 38.

Figure 3:
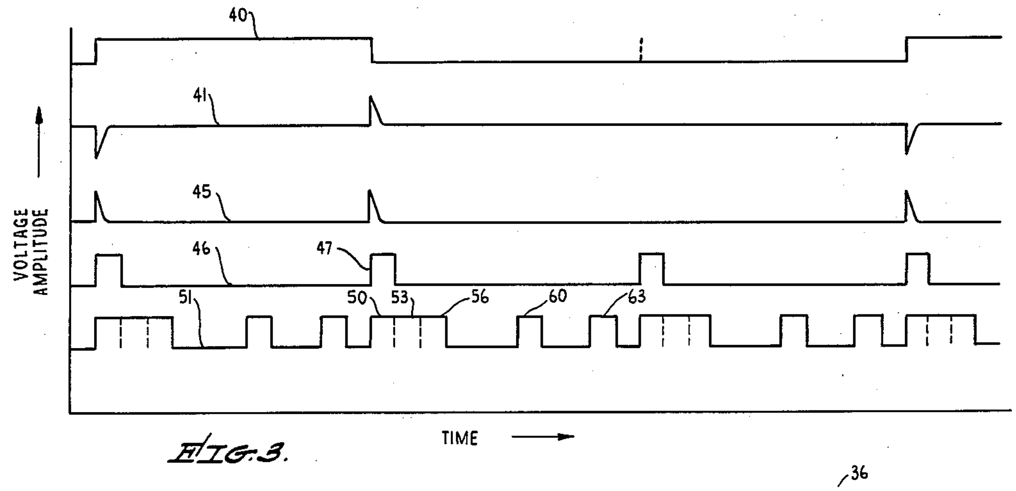
FIG. 3 is a diagram of the wave forms present in the transmitter of FIG. 2 when in operation.
Figures 4, 5:
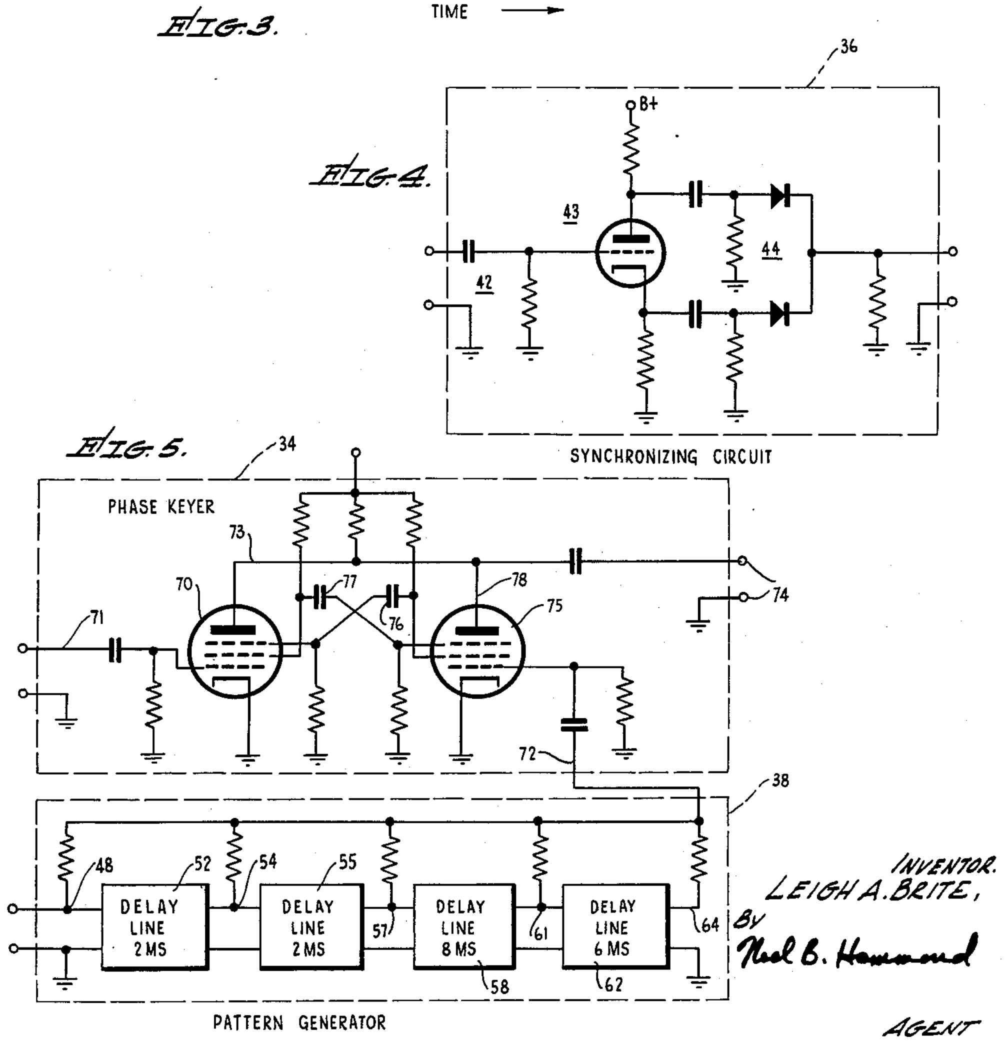
FIG. 4 is a circuit diagram of a synchronizing circuit which may be employed in the transmitter of FIG. 2.
FIG. 5 is a circuit diagram partly in block form of a pattern generator and a phase keyer which may be employed in the transmitter of FIG. 2.

A control pulse, for example, pulse 47 of waveform 46 of FIG. 3, appears at lead 48 of the pattern generator 38 illustrated in FIG. 5 to provide control pulse 50 of waveform 51. Delay line section 52 delays the pulse 47 by 2 milliseconds to develop the second pulse 53 of the pattern at lead 54. Delay line section 55 delays pulse 53 an additional 2 milliseconds to develop pulse 56 at terminal 57. Similarly, delay line section 58 delays pulse 56 8 milliseconds to develop pulse 60 at terminal 61, and delay line section 62 delays pulse 60 6 milliseconds to develop the last pulse 63 of the pattern at terminal 64.

The control pulses developed by the pattern generator 38 are then coupled to the phase keyer which shifts the phase of the carrier wave by 180° each time a control pulse is present. The phase keyer 34 shown in detail in FIG. 5 comprises two controlled amplifiers. An amplifier tube 70 receives the pulse-modulated carrier wave from the carrier oscillator 33 on lead 71. When no control pulse is present on lead 72, the carrier wave appears at the plate lead 73 of tube 70 and is coupled to the output terminals 74 with the phase designated as minus. A second amplifier tube 75 is normally cut off during this interval. However, when a control pulse is present at lead 72, tube 75 is biased to an operative condition by the positive control pulses and a negative control pulse is applied from the screen grid of tube 75 through capacitor 76 to the suppressor grid of tube 70 to turn it off. The signal having a phase designated as minus is coupled from the screen grid of tube 70 through capacitor 77 to the suppressor grid of tube 75. Due to the phase reversal through the tube 75, the signal appears with the plus phase at the plate lead 78 of tube 75 and is then coupled to the output terminal 74 of the phase keyer 34.

The pulse-modulated carrier wave having quasi-random phase-changes throughout each pulse is then coupled to the transmitter output circuits 35 where they are amplified and radiated. The radiated pulse signals will be of the nature of those illustrated as curve 18 of FIG. 1. Regardless of phase-shifts in the propagation paths, the extremes of complete addition and complete subtraction of pulse signal components have been avoided. No increase in signalling speed has been obtained but the usability of a propagation path has been increased because fading is minimized. The phase stability of the propagation medium is now of no concern.

It will be apparent that, although the present invention has been described as being useful in conjunction with a pulse-modulated transmitter, the principle may be applied to systems which radiate otherwise unmodulated carrier waves. Examples of such systems are continuous-wave radar and radio navigational aids.

Although the phase reversals take place at a more rapid rate than the signalling rate, no increase in bandwidth is necessary because the bandwidth of most pulse signalling systems is already wider than that necessitated by the signalling rate. In systems such as frequency-shift radioteletype, the bandwidth is determined by the frequency stability of the transmitter and receiver. Thus, the use of the phase-reversal during the pulse signals merely makes better use of the bandwidth already employed.

At the receiver the usual type of non-phase-sensitive detection is employed. In fact, coherent phase detection is particularly to be avoided. Thus, the present invention may be applied to many existing communications systems by a modification at the transmitter only, while receiving stations may remain unchanged. Thus, the receivers may be used to receive transmissions from either conventional transmitters or transmitters constructed according to the invention.

A further advantage of the present quasi-randomly phase-modulated transmission is that interference with other signals on the same frequency is minimized. An example of such advantage is found in the case where the frequency difference between an interfering signal and the desired signal is small and a very low frequency heterodyne signal occurs. In many types of detectors a coherent type of detection results from the beat between the interfering signal and the desired signal which may produce reversals in the information pattern. This, in some cases, can be worse than mere destruction of the desired signal. However, when the desired signal is formulated according to the present invention, such an undesirable effect cannot occur because the coherent detection effect can occur only during a fraction of a complete pulse.

Thus, there has been described a radio transmitter having a circuit for modifying the phase of a carrier wave to reduce the effects of destructive interference due to cancellation between out-of-phase multipath signal components.

What is claimed is:

1. A circuit to be utilized in conjunction with a frequency-shift radioteletype transmitter developing a pulse-modulated carrier wave for modifying the carrier wave so as to reduce destructive interference at a receiver caused by cancellation between out-of-phase components of the carrier wave, the circuit comprising a pulse source for developing initiating pulses which start at the beginning of the modulation pulses but are shorter in duration, a delay line having input terminals coupled to the pulse source and also having taps coupled to output terminals, the number of taps, the delay between taps and the duration of the initiating pulses being selected to cause a series of quasi-randomly spaced control pulses to appear at the output terminals of the delay line in response to each initiating pulse and to cause the series of control pulses to end at the end of each modulation pulse, and a phase-varying circuit responsive to the carrier wave and coupled to the output terminals of the delay line for varying the phase of the carrier wave in response to the control pulses to introduce a plurality of quasi-random variations of the phase of the carrier wave during each modulation pulse.

2. A phase modulator for abruptly shifting the phase of a pulse-modulated carrier wave between two opposed phases a plurality of times within the duration of each pulse envelope to inhibit the cancellation of out-of-phase components of the carrier wave, said phase modulator comprising means for developing a pulse-modulated wave, a synchronizing circuit coupled to the wave-developing means and responsive to the modulated wave for developing synchronizing pulses whose leading edges are coincident with the leading edges of the pulse envelopes of the wave, a synchronizable pulse generator coupled to said synchronizing circuit for developing recurrent pulses of short duration having a repetition frequency equal to the pulse envelope frequency of the pulse modulated wave and having leading edges synchronized with the leading edges of the synchronizing pulses, a pulse pattern generator coupled to said pulse generator and responsive to the recurrent pulses for developing groups of control pulses which occur at quasi-random intervals, there being a number of control pulses during the duration of a pulse envelope, and a phase changing circuit coupled to said means for developing a pulse-modulated carrier wave for shifting the phase of the wave in response to the control pulses.

3. Apparatus for phase-modulating a pulse-modulated carrier wave in a quasi-random manner to reduce destructive interference caused by cancellation between out-of-phase components of the carrier wave, said apparatus comprising a synchronizing circuit responsive to the modulation pulses of the carrier wave for developing synchronizing pulses having leading edges coincident with the leading edges of the modulation pulses of the carrier wave, a synchronizable pulse source coupled to said synchronizing circuit for developing pattern-initiating pulses having a predetermined duration and having a repetition frequency equal to that of the modulation pulses of the carrier wave and having leading edges coincident with the leading edges of the modulation pulses of the carrier wave, a tapped delay line coupled to said pulse source for developing quasi-randomly occurring control pulses at the taps thereof in response to a pattern-initiating pulse applied to the input terminals, the delay times between the taps of said delay line and the duration of the pattern-initiating pulses being proportioned for causing the control pulses to terminate no later than the trailing edges of the modulation pulses of the carrier wave, and a phase-reversing gate circuit responsive to the carrier wave and coupled to said delay line for reversing the phase of the carrier wave in response to the control pulses to develop a carrier wave further modulated by phase reversals in a quasi-random manner.

4. A transmitter comprising keying means for developing keying pulses, a synchronizing circuit coupled to said keying means for developing synchronizing pulses in response to the keying pulses, a pulse generator coupled to said synchronizing circuit and responsive to the synchronizing pulses for developing initiating pulses, a pulse pattern generator coupled to said pulse generator and responsive to the initiating pulses for developing quasi-randomly occurring control pulses, a carrier wave source, first and second controlled amplifiers each having a signal input terminal, a control input terminal, an intermediate output terminal and a signal output terminal, the signal input terminal of said first amplifier being coupled to said carrier wave source, the signal input terminal of said second amplifier being coupled to the intermediate output terminal of said first amplifier, the control input terminal of said first amplifier being coupled to the intermediate output terminal of said second amplifier, the signal input terminal of said second amplifier being coupled to said pulse pattern generator, said second amplifier developing inverted control pulses at its intermediate output terminal in response to the control pulses from said pulse pattern generator, said first amplifier developing an inverted carrier wave signal at its intermediate output terminal in response to the carrier wave from said carrier wave source, said first amplifier developing an inverted carrier wave signal at its signal output terminal in response to the carrier wave from said carrier wave source when the inverted control pulses are not occurring at the intermediate output terminal of said second amplifier, said second amplifier developing a re-inverted carrier wave signal at its signal output terminal in response to the inverted carrier wave signal developed at the intermediate output terminal of said first amplifier when the control pulses are developed by said pulse pattern generator, and a transmitter output circuit coupled to the signal output terminals of said amplifiers for receiving the inverted carrier wave signal when the control pulses do not occur and for receiving the re-inverted carrier wave signal when the control pulses do occur.

5. In a transmitter for modulating a carrier wave with modulation pulses, said transmitter including keying means for developing keying pulses, a carrier wave source, and a transmitter output circuit, the combination of a synchronizing circuit connected to the keying means for developing synchronizing pulses occurring coincidently with the leading and trailing edges of each of the modulation pulses, a synchronizable square pulse generator connected to said synchronizing circuit and responsive to the synchronizing pulses for developing initiating pulses which start at the beginning of the modulation pulses but are shorter in duration, a pulse pattern generator connected to said pulse generator and responsive to the initiating pulses for developing quasi-randomly spaced control pulses, a number of which are provided during each modulation pulse, and a phase changing circuit connected in series between the carrier wave source and the transmitter output circuit and connected to said pulse pattern generator for varying the phase of the carrier wave in response to the control pulses, said phase changing circuit comprising first and second controlled amplifiers each having a signal input terminal, a control input terminal, an intermediate output terminal and a signal output terminal, the signal input terminal of said first amplifier being coupled to said carrier wave source, the signal input terminal of said second amplifier being coupled to the intermediate output terminal of said first amplifier, the control input terminal of said first amplifier being coupled to the intermediate output terminal of said second amplifier, the signal input terminal of said second amplifier being coupled to said pulse pattern generator, said second amplifier developing inverted control pulses at its intermediate output terminal in response to the control pulses from said pulse pattern generator, said first amplifier developing an inverted carrier wave signal at its intermediate output terminal in response to the carrier wave from said carrier wave source, said first amplifier developing an inverted carrier wave signal at its signal output terminal in response to the carrier wave from said carrier wave source when the inverted control pulses are not occurring at the intermediate output terminal of said second amplifier, said second amplifier developing a re-inverted carrier wave signal at its signal output terminal in response to the inverted carrier wave signal developed at the intermediate output terminal of said first amplifier when the control pulses are developed by said pulse pattern generator, the signal output terminals of said amplifiers being connected to the transmitter output circuit for applying thereto the inverted carrier wave signal when the control pulses do not occur and the re-inverted carrier wave signal when the control pulses do occur.

6. In a transmitter for modulating a carrier wave with modulation pulses, said transmitter including keying means for developing keying pulses, a carrier wave source, and transmitter output circuit, the combination of a synchronizing circuit connected to the keying means for developing synchronizing pulses occurring coincidently with the leading and trailing edges of each of the modulation pulses, said synchronizing circuit comprising a differentiating circuit connected to the keying means for developing positive and negative trigger pulses in response to trailing and leading edges of the keying pulses, a phase inverter circuit connected to said differentiating circuit for developing both a positive and a negative pulse in response to each of the trigger pulses, said synchronizing circuit also comprising a full-wave rectifier connected to said phase inverter circuit for developing positive synchronizing pulses in response to each pair of positive and negative pulses, a synchronizable square pulse generator connected to said synchronizing circuit and responsive to the synchronizing pulses for developing initiating pulses which start at the beginning of the modulation pulses but are shorter in duration, a pulse pattern generator connected to said pulse generator and responsive to the initiating pulses for developing a number of quasi-randomly spaced control pulses during each modulation pulse, said pattern generator comprising a delay line having input terminals connected to said pulse source and also having taps coupled to output terminals, the number of taps, the delay between taps and the duration of the initiating pulses being selected to cause a series of quasi-randomly spaced control pulses to appear at the output terminals of said delay line in response to each initiating pulse and to cause the series of control pulses to end at or before the end of each modulation pulse, and a phase changing circuit connected in series between the carrier wave source and the transmitter output circuit and connected to said pulse pattern generator for varying the phase of the carrier wave in response to the control pulses, said phase changing circuit comprising first and second controlled amplifiers each having a signal input terminal, a control input terminal, an intermediate output terminal and a signal output terminal, the signal input terminal of said first amplifier being coupled to said carrier wave source, the signal input terminal of said second amplifier being coupled to the intermediate output terminal of said first amplifier, the control input terminal of said first amplifier being coupled to the intermediate output terminal of said second amplifier, the signal input terminal of said second amplifier being coupled to said pulse pattern generator, said second amplifier developing inverted control pulses at its intermediate output terminal in response to the control pulses from said pulse pattern generator, said first amplifier developing an inverted carrier wave signal at its intermediate output terminal in response to the carrier wave from said carrier wave source, said first amplifier developing an inverted carrier wave signal at its signal oput terminal in response to the carrier wave from said carrier wave source when the inverted control pulses are not occurring at the intermediate output terminal of said second amplifier, said second amplifier developing a re-inverted carrier wave signal at its signal output terminal in response to the inverted carrier wave signal developed at the intermediate output terminal of said first amplifier when the control pulses are developed by said pulse pattern generator, the signal output terminals of said amplifiers being connected to the transmitter output circuit for applying thereto the inverted carrier wave signal when said control pulses do not occur and the re-inverted carrier wave signal when the control pulses do occur.

7. A circuit to be utilized in conjunction with a radio transmitter developing a pulse-modulated carrier wave for modifying the carrier wave so as to reduce destructive interference at a receiver caused by cancellation between out-of-phase components of the carrier wave, the circuit comprising means developing initiating pulses which start at the beginning of the modulation pulses but are shorter in duration, delay means coupled to the means developing initiating pulses and having taps, the number of taps, the delay between taps and the duration of the initiating pulses being selected to cause a series of quasi-randomly spaced control pulses to appear at the output of the delay means in response to each initiating pulse and to cause the series of control pulses to end at the end of each modulation pulse, and phase-varying means coupled to the output of the delay means for varying the phase of an applied carrier wave in response to the control pulses to introduce a plurality of quasi-random variations of the phase of the carrier wave during each modulation pulse.

8. A circuit to be utilized in conjunction with a radio transmitter developing a pulse-modulated carrier wave for modifying the carrier wave so as to reduce destructive interference at a receiver caused by cancellation between out-of-phase components of the carrier wave, the circuit comprising means developing initiating pulses which start at the beginning of the modulation pulses but are shorter in duration, delay means coupled to the means developing initiating pulses and having a plurality of taps arranged to provide a series of quasi-randomly spaced control pulses at the output of the delay means in response to each initiating pulse and to cause the series of control pulses to end at the end of each modulation pulse, and phase-varying means coupled to the output of the delay means for varying the phase of an applied carrier wave in response to the control pulses.

9. A circuit to be utilized in conjunction with a radio transmitter developing a pulse-modulated carrier wave for modifying the carrier wave so as to reduce destructive interference at a receiver caused by cancellation between out-of-phase components of the carrier wave, the circuit comprising means developing initiating pulses which start at the beginning of the modulation pulses but are shorter in duration, means coupled to the means developing initiating pulses and providing a series of quasi-randomly spaced control pulses in response to each initiating pulse, and means coupled to the means providing control pulses for varying the phase of an applied carrier wave in response to the control pulses.

10. A phase modulator for abruptly shifting the phase of a pulse-modulated carrier wave between two opposed phases a plurality of times within the duration of each pulse envelope to inhibit the cancellation of out-of-phase components of the carrier wave, said phase modulator comprising means developing a pulse-modulated wave, a synchronizing circuit coupled to the wave-developing means and responsive to the modulated wave for developing synchronizing pulses whose leading edges are coincident with the leading edges of the pulse envelopes of the wave, a synchronizable pulse source coupled to said synchronizing circuit for developing recurrent pulses of short duration having a repetition frequency equal to the pulse envelope frequency of the pulse modulated wave and having leading edges synchronized with the leading edges of the synchronizing pulses, means coupled to said pulse source and responsive to the recurrent pulses for developing groups of control pulses which occur at quasi-random intervals, there being a plurality of control pulses during the duration of a pulse envelope, and a phase changing circuit coupled to said means developing a pulse-modulated carrier wave for shifting the phase of the wave in response to the control pulses.

11. A phase modulator for shifting the phase of a pulse-modulated carrier wave a plurality of times within the duration of each pulse envelope to inhibit the cancellation of out-of-phase components of the carrier wave, said phase modulator comprising means developing a pulse-modulated wave, means coupled to the wave-developing means and responsive to the modulated wave for developing synchronizing pulses whose leading edges are coincident with the leading edges of the pulse envelopes of the wave, means coupled to said means developing synchronizing pulses for developing recurrent pulses of short duration having a repetition frequency equal to the pulse envelope frequency of the pulse modulated wave and having leading edges synchronized with the leading edges of the synchronizing pulses, means coupled to said means developing recurrent pulses for developing groups of control pulses which occur at quasi-random intervals in response to the recurrent pulses, there being a plurality of control pulses during the duration of a pulse envelope, and a phase changing circuit coupled to said means developing a pulse-modulated carrier wave for shifting the phase of the wave in response to the control pulses.

12. A phase modulator for shifting the phase of a pulse-modulated carrier wave a plurality of times within the duration of each pulse envelope to inhibit the cancellation of out-of-phase components of the carrier wave, said phase modulator comprising means responsive to an applied pulse-modulated wave for developing synchronizing pulses whose leading edges are coincident with the leading edges of the pulse envelopes of the wave, means coupled to said means developing synchronizing pulses for developing recurrent pulses of short duration having a repetition frequency equal to the pulse envelope frequency of the pulse modulated wave and having leading edges synchronized with the leading edges of the synchronizing pulses, means coupled to said means developing recurrent pulses for developing groups of control pulses which occur at quasi-random intervals in response to the recurrent pulses, there being a plurality of control pulses during the duration of a pulse envelope, and a phase changing circuit coupled to said means developing control pulses for shifting the phase of the applied wave in response to the control pulses.

13. A phase modulator for shifting the phase of a pulse-modulated carrier wave a plurality of times within the duration of each pulse envelope to inhibit the cancellation of out-of-phase components of the carrier wave, said phase modulator comprising means developing recurrent pulses of short duration having a repetition frequency equal to the pulse envelope frequency of the pulse modulated wave, means coupled to said means developing recurrent pulses for developing groups of control pulses which occur at quasi-random intervals in response to the recurrent pulses, there being a plurality of control pulses during the duration of a pulse envelope, and a phase changing circuit coupled to said means developing control pulses for shifting the phase of the applied wave in response to the control pulses.

14. Apparatus for phase-modulating a carrier wave in a quasi-random manner to reduce destructive interference caused by cancellation between out-of-phase components of the carrier wave, said apparatus comprising a pulse source developing pattern-initiating pulses having a predetermined duration and repetition rate, a tapped delay line coupled to said pulse source for developing quasi-randomly occurring control pulses at the taps thereof in response to a pattern-initiating pulse applied thereto, and a phase-reversing gate circuit responsive to a carrier wave and coupled to the taps of said delay line for reversing the phase of the carrier wave in response to the control pulses to modulate the carrier wave by quasi-random phase reversals.

15. Apparatus for phase-modulating a carrier wave in a quasi-random manner to reduce destructive interference caused by cancellation between out-of-phase components of the carrier wave, said apparatus comprising means developing initiating pulses having a predetermined duration and repetition rate, means coupled to said means developing initiating for developing quasi-randomly occurring control pulses in response to an initiating pulse applied thereto, and phase-reversing means responsive to a carrier wave and coupled to said means developing control pulses for reversing the phase of the carrier wave in response to the control pulses to modulate the carrier wave by quasi-random phase reversals.

References Cited in the file of this patent

UNITED STATES PATENTS

| | | |
|---|---|---|
| 1,882,698 | Alexanderson | Oct. 18, 1932 |
| 2,666,181 | Courtillot | Jan. 12, 1954 |
| 2,672,509 | McCoy | Mar. 16, 1954 |
| 2,779,933 | Bradburd | Jan. 29, 1957 |
| 2,881,320 | Goldberg | Apr. 7, 1959 |
| 2,923,891 | Nicholson | Feb. 2, 1960 |